United States Patent
Weber et al.

(10) Patent No.: US 6,701,486 B1
(45) Date of Patent: Mar. 2, 2004

(54) METHOD, APPARATUS, AND COMPUTER PROGRAM PRODUCT FOR AUTOMATIC PAGE SUPPRESSION IN FORMS

(75) Inventors: Jay C. Weber, Menlo Park, CA (US); Caius Van Nouhuys, San Francisco, CA (US)

(73) Assignee: Grischa Corporation, Hillsborough, CA (US)

( * ) Notice: Subject to any disclaimer, the term of this patent is extended or adjusted under 35 U.S.C. 154(b) by 0 days.

(21) Appl. No.: 09/363,978

(22) Filed: Jul. 29, 1999

(51) Int. Cl.[7] ............................ G06F 17/30; G06F 17/40
(52) U.S. Cl. ............................ 715/507; 705/20; 705/24; 705/26; 705/27
(58) Field of Search .................................. 707/505, 506, 707/507, 508, 513; 715/513, 525, 508, 507, 506; 705/20, 24, 26, 27

(56) References Cited

U.S. PATENT DOCUMENTS

| | | | | |
|---|---|---|---|---|
| 5,732,219 A | * | 3/1998 | Blumer et al. | 709/227 |
| 5,835,920 A | * | 11/1998 | Horton | 148/441 |
| 5,920,696 A | | 7/1999 | Brandt et al. | 709/218 |
| 6,167,523 A | * | 12/2000 | Strong | 707/507 |
| 6,313,835 B1 | * | 11/2001 | Gever et al. | 345/629 |
| 6,345,278 B1 | * | 2/2002 | Hitchcock et al. | 707/100 |
| 6,347,943 B1 | * | 2/2002 | Fields et al. | 434/118 |

FOREIGN PATENT DOCUMENTS

| | | |
|---|---|---|
| EP | 0844767 A1 | 8/1997 |
| WO | WO 99/23558 | 10/1998 |
| WO | WO 99/13424 | 3/1999 |

OTHER PUBLICATIONS

Azmurlo, M. et al., "A Network of Asynchronous Micro-servers as a Framework for Server Development", Computer Networks and ISDN Systems, vol. 29, No. 8–13, pp. 1041–1051 (9/97).

Lameter, C., et al., "lftp—Sophisticated ftp program" Internet Document: LFTP Manpage, http://www.dca.fee.unicamp.br/cgi–bin/man2ntml/n/net/man1/1ftp.1: p. 1, (Jan. 18, 2001).

(List continued on next page.)

*Primary Examiner*—Stephen S. Hong
*Assistant Examiner*—Matthew Ludwig
(74) *Attorney, Agent, or Firm*—Blakely, Sokoloff, Taylor & Zafman, LLP

(57) ABSTRACT

Disclosed are methods for reducing the number of "pages", e.g. HTML, JavaScript/ECMA Script, or XML documents or the like, in forms-based transaction applications. One disclosed method involves using dynamic contents documents such as JavaServer pages that include a list of required fields for completion of a transaction. When the transaction initiates the dynamic contents document interacts with a server process to determine if sufficient values for the required form fields are already available, for instance, from a user profile or previous transaction. If so, these values can be used. If, for one or more pages, a form field value is not available, these and only these pages are provided to the user; the others are suppressed. In another aspect, rather than having an ordered set of predetermined pages some of which can be suppressed, just in time pagination is obtained by determining which fields lack sufficient field values, a priori. These field values are placed in pages as they are located and the pages provided to the user when they reach a suitable size. With just in time pagination, those and only those form fields for which user data input is needed can be split into pages suitable for viewing on the user's client platform and provided to the user.

15 Claims, 5 Drawing Sheets

OTHER PUBLICATIONS

Peterson, J., "The ASP 101 Discussion Forum" Internet Document, "Online!", Jan. 26, 1999, pp. aspforum_1.asp—aspforum_4.asp, XP002160642m http://www.asp101.com.resources.

Betz, M., "Active Data Object & ASP", Dr. Dobb's Journal, May, 1998, pp. 88–91–111–112.

Anonymous, "Active Server Pages . . . " Internet Document, "Online?" XP002160643 http://www.4guysfromrolla.com/webtech/ASP_index_99.shtml, 92–15–01).

* cited by examiner

METHOD, APPARATUS, AND COMPUTER PROGRAM PRODUCT FOR AUTOMATIC PAGE SUPPRESSION IN FORMS

RELATED APPLICATIONS

Subject matter in this application may be used in conjunction with subject matter described in a commonly owned patent application entitled "A Method, Apparatus, And Computer Program Product for Deferred Completion of Multi-Step Network User Transaction Applications" naming Jay C. Weber, Todd Lash, and Suzanne Stefanac as inventors, which is filed concurrently herewith and assigned application Ser. No. 09/364,170, and which is incorporated herein in its entirety by this reference.

FIELD

The invention relates generally systems for on-line transactions and, more particularly, to transaction architectures in client server communications employing markup language based electronic forms for processing transaction related information.

BACKGROUND

Client-server applications employing markup language based electronic documents, e.g. the World Wide Web, often involve forms (also referred to herein as "forms pages"). Electronic commerce applications are particularly reliant on forms for receiving information from a party to a transaction that information which is necessary to complete the transaction. Especially as these applications are made available to devices with limited resolutions (compared to the displays commonly used with conventional personal computers or workstations) these forms are spanning multiple pages. This trend towards the proliferation of forms pages has at least two undesirable effects.

A first undesirable effect is that a succession of pages can become tedious and frustrating to the user. Users are frequently drawn to, for instance World Wide Web applications, because of their increased convenience over conventional methods of transacting. A tedious succession of forms pages to complete a transaction negates at least a portion of the user benefits to transacting in this way. "Impulse transactions" are desirable from a consumer perspective, as they allow the consumer to immediately (or more nearly so) obtain and enjoy items they wish to consume and the tedious succession of forms pages may prevent "impulse transactions." Accordingly, it would be desirable for a system to exist that allowed for the reduction or elimination of the number of forms pages required for a user to complete a forms-based transaction application.

A second undesirable effect is that multiple forms pages involve multiple requests for resources of the server, thereby increasing server overhead. For instance, an operator of an electronic marketplace may have an appreciable amount of overhead costs devoted to hardware for adequate transaction processing abilities to serve customers promptly. If each transaction requires processing multiple forms pages, as the number of forms pages increases, the operator needs to invest in additional computing hardware to maintain the same level of prompt customer service. Thus it would be advantageous for means to exist by which server operators processing forms-based transactions could reduce the number of forms pages required to complete a transaction.

Increasingly, user transaction applications cultivate repeat usage through a user registration process or by storing for later use the information provided by users in previous transaction sessions. In either instance, a sever process carrying on a user transaction application may have available to it sufficient information to complete, at least some, of the form fields that are required to complete the user transaction application. Further, a repeat user may desire that the server process use the available sufficient information without confirmation to complete the user transaction application. In particular, for forms pages that contain only fields for which sufficient form field values are already available, given the user's consent it may be desirable to suppress providing those forms pages to the user.

One conventional approach directed towards streamlining user transaction applications are conventional "one-click" or "single step" ordering systems used in electronic commerce transactions. An exemplary system is described in WO9913424, entitled "Method and System for Placing a Purchase Order Via A Communications Network" for applicant Amazon.com. Single-step ordering systems do streamline product purchase transactions, however they do not provide a solution for automatic page suppression in forms. Typically "single-step" systems involve a pre-registration process in which a user enters the information necessary to complete transactions (generally spanning multiple forms pages) with the system. Then, when a subsequent transaction is initiated, either the entire series of transaction pages is skipped or the entire series of transaction pages must have their form field values re-entered by the user. That is, conventional systems provide no logic with respect to which aspects of a series of forms pages can be suppressed.

Conventional systems present significant disadvantages if the user is engaged in activity in addition to completing the user transaction application. For instance, when a user's client application is a device that integrates television reception with, for instance HTTP client capability, the user may initiate a user transaction application in response to an interactive portion of a video program. In this context, the user could naturally desire to complete the user transaction application with dispatch so that they can return to viewing the video program. Conventional single-step systems would be inadequate solutions in this context. This is due, in part, to the fact that they typically require the user to process the entire series of forms pages to complete input of only a few form fields, when sufficient form field values are unavailable for the few form fields. Accordingly, there is a need for a system of automatic page suppression in forms that is flexible and optimized to suppress as much of a series of forms pages as can be suppressed with user consent.

SUMMARY

In order to provide a solution to the forgoing and additional problems, aspects the present invention provide a method, apparatus, and system for automatic page suppression in forms.

One aspect of the invention involve methods for reducing the number of pages provided for user input in forms-based user transaction applications. An illustrative method includes examining a set of form fields associated with information required to complete a user transaction application for determining if sufficient form field values corresponding to the set of form fields are available to complete the user transaction application; and if at least one of the form field values corresponding to the set of form fields is unavailable, providing a page for receiving the at least one of the set of form field values; and otherwise providing a request to a successor page for further processing of the user transaction application. In a variation, the illustrative method includes providing a selectable option for determining whether the user transaction application should have the number of pages for user input reduced and, wherein reducing the number of pages provided for user input in forms-based user transaction applications occurs only if the selectable option is selected. In another variation, the set of form fields is divided among a plurality of ordered pages; and the step of providing a request to a successor page comprises redirecting a request to the successor page. Still further, providing a page for receiving the at least one of the set of form field values may include: repetitively adding at least one of the form fields corresponding to the at least one of the set of form field values to a developing page; and providing the developing page for receiving the at least one of the set of form field values. In an additional variation, adding at least one of the form fields may include determining if adding at least one of the form fields would result in the developing page, when rendered by a client application, to exceed predetermined limits, and; if not, adding the at least one of the form fields to the developing page.

Yet another aspect of the invention is a computing apparatus configured with programmed instructions for reducing the number of pages provided for user input in forms-based user transaction applications. The programmed instructions configure the computing apparatus to provide structures for implementing particular functions in accordance with some embodiments of the invention. In an illustrative computing apparatus, the programmed instructions configure the computing apparatus to provide structures for: examining a set of form fields associated with information required to complete a user transaction application; determining if sufficient form field values corresponding to the set of form fields are available to complete the user transaction application; and providing a page for receiving the at least one of the set of form field values if at least one of the form field values corresponding to the set of form fields is unavailable and otherwise providing a request to a successor page for further processing of the user transaction application. In a variation, the illustrative method includes providing a selectable option for determining whether said user transaction application should have the number of pages for user input reduced and, wherein reducing the number of pages provided for user input in forms-based user transaction applications occurs only if said selectable option is selected. In a variation the set of form fields is divided among a plurality of ordered pages; and providing a request to a successor page includes redirecting a request to the successor page. In addition, providing a page for receiving the at least one of the set of form field values may include repetitively adding at least one of the form fields corresponding to the at least one of the set of form field values to a developing page; and providing the developing page for receiving the at least one of the set of form field values. In a variation, adding at least one of the form fields may include determining if adding at least one of the form fields would result in the developing page, when rendered by a client application, to exceed predetermined limits, and if not, adding the at least one of the form fields to the developing page.

Yet another aspect of the invention is a computer program product comprising a computer readable storage medium having computer readable code embodied therein for reducing the number of pages provided for user input in forms-based user transaction applications,. The computer readable code includes code for examining a set of form fields associated with information required to complete a user transaction application; code for determining if sufficient form field values corresponding to the set of form fields are available to complete the user transaction application; and code for providing a page for receiving the at least one of the set of form field values if at least one of the form field values corresponding to the set of form fields is unavailable and otherwise providing a request to a successor page for further processing of the user transaction application. In another aspect, the code providing a page for receiving the at least one of the set of form field values may include: code for repetitively adding at least one of the form fields corresponding to the at least one of the set of form field values to a developing page; and code for providing the developing page for receiving the at least one of the set of form field values. Also, adding at least one of the form fields may include determining if adding at least one of the form fields would result in the developing page, when rendered by a client application, to exceed predetermined limits, and if not, adding the at least one of the form fields to the developing page. In another variation the set of form fields is divided among a plurality of ordered pages; and providing a request to a successor page comprises redirecting a request to the successor page.

BRIEF DESCRIPTION OF THE DRAWINGS

These and other features, aspects, and advantages of the present invention will become better understood with regard to the following description, appended claims, and accompanying drawings where:

DETAILED DESCRIPTION

DESCRIPTION OF FIGURES

Figure 1:
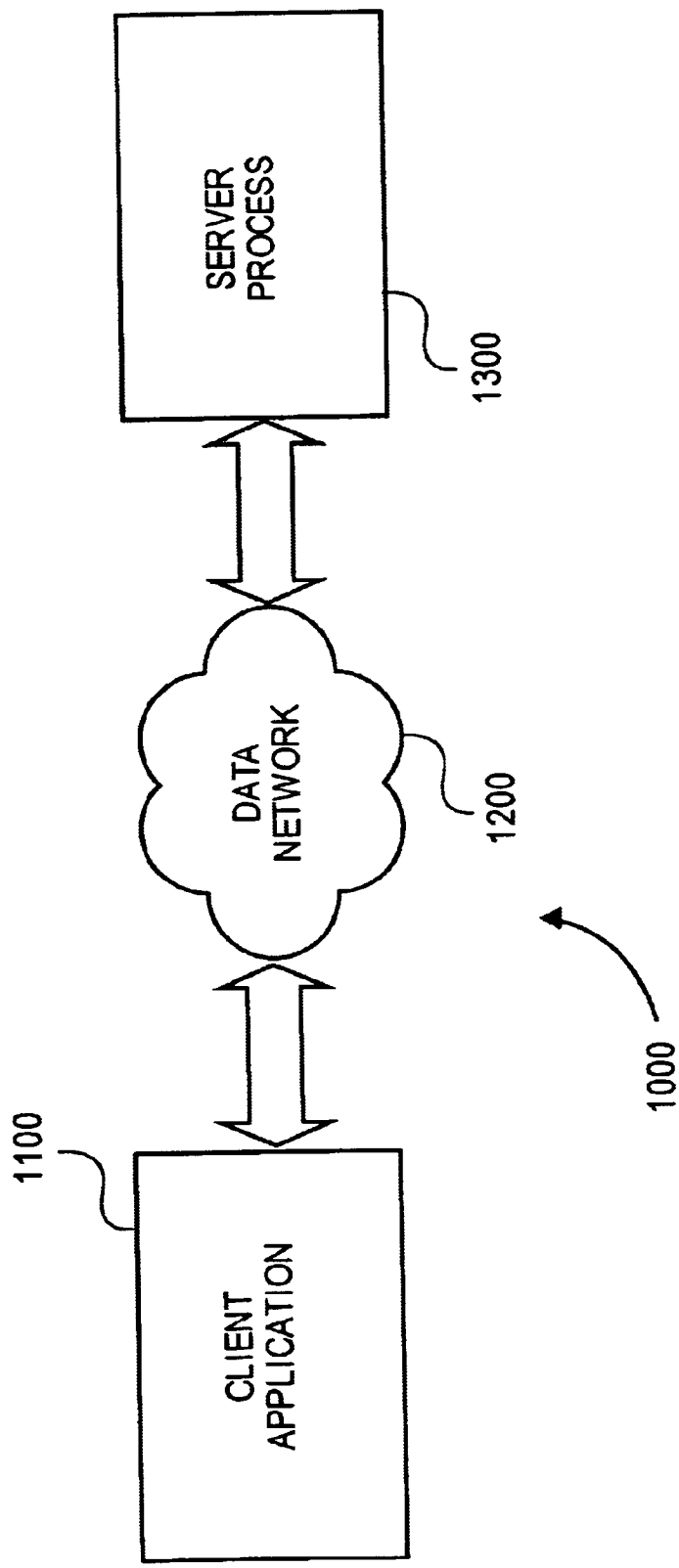
FIG. 1 is a diagram of elements in an operating environment in which an illustrative embodiment can be employed.

FIG. 1 depicts elements in an operating environment 1000 in accordance with an illustrative embodiment. A client application 1100 and a sever process 1300 are shown. The client application 1100 and the sever process 1300 are configured for client-server communication across a data network 1200. In some embodiments, the data network 1200 comprises a portion of the Internet, although other networks could be used, either public or private, using either the TCP/IP protocols (including the User Datagram Protocol) or with other protocols. In preferred embodiments the Hypertext Transfer Protocol ("HTTP") is used to communicate Request and Response messages and Hypertext Markup Language ("HTML") pages. Other embodiments could use the Extensible Markup Language ("XML") or other markup language.

In some embodiments, the client application 1100 executes on a hardware platform that integrates the features of a television receiver and an HTTP client. Many commercially available structures can perform these functions. Certain of the current generation of "set-top boxes" are suitable, including, for instance, the WebTV "Plus". set-top box (also referred to as an Internet Receiver) available through Microsoft's WebTV Networks, Inc. of Palo Alto, Calif. (and its manufacturing licensees). In other embodiments, the client application could execute on a general purpose computer configured with suitable video hardware to integrate the features of a television receiver and a client application. As one skilled in the art will appreciate from this disclosure, the features of the invention are not limited to embodiments which operate with client platforms that integrate television and network connectivity. However, the features of the invention obtain particular benefits in this context.

Figure 2:
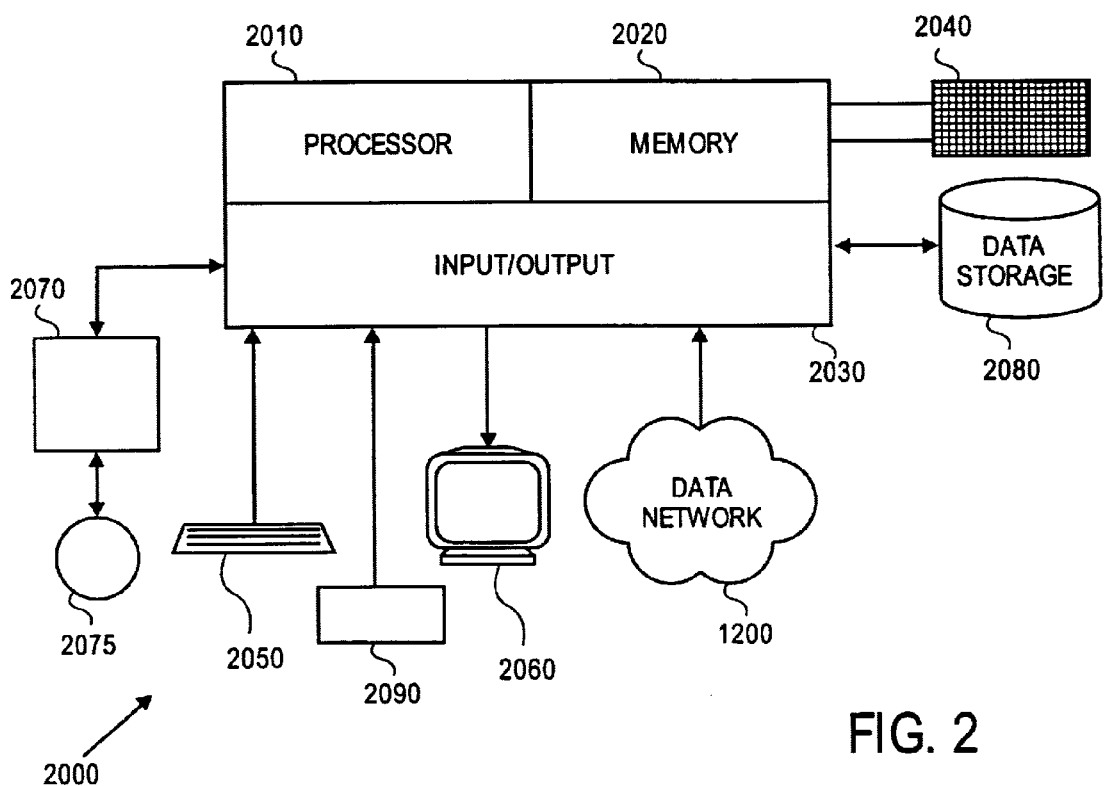
FIG. 2 depicts a computer system capable of being configured to embody aspects of the invention in accordance with an illustrative embodiment.

FIG. 2 depicts a computer system 2000 capable of embodying aspects of the invention. The sever process 1300 may execute on structures in accordance with the computer system 2000. The computer system 2000 comprises a microprocessor 2010, a memory 2020 and an input/output system 2030. The memory 2020 is capable of being configured to provide a data structure 2040 which may contain data manipulated by the computer system 2000 when embodying aspects of the invention. Further illustrated is a media drive 2070, such as a disk drive, CD-ROM drive, or the like. The media drive 2070 may operate with a computer-usable storage medium 2075 capable of storing computer-readable program code able to configure the computer system 2000 to embody aspects of the invention. In other embodiments, the computer system 2000 could be a diskless computer with a non-volatile memory. The input/output system 2030 may also operate with a keyboard 2050, a display 2060, a pointing device 2090, or a network such as the data network 1200. The input/output system 2030 may also communicate with a mass data storage 2080 such as a database or the like. The mass data storage 2080 may store information related to users of the client application 1100 that facilitate completion of a user transaction application, including, for instance, user profile information, records of past interactions, payment instrument information, demographic information, product or service feature preference information, or the like.

As illustrated, the computer system 2000 is general-purpose computing machinery. As one of skill recognizes, programmed instructions may configure general purpose computing machinery to embody structures capable of performing functions in accordance with aspects of the invention. Special purpose computing machinery comprising, for example, an application specific integrated circuit (ASIC) may also be used. Further, configurable hardware could be used including, for instance, a field programmable gate array or a complex programmable logic device. One skilled in the art will recognize, numerous structures of programmed or programmable logic capable of being configured to embody aspects of the invention. In some embodiments, the computer system 2000 is a SPARC-based workstation from Sun Microsystems of Mountain View, Calif., running the SOLARIS operating system and the Apache HTTP server with a Secure Sockets Layer module. In such embodiments, the sever process 1300 could comprise the Apache HTTP server with the Secure Sockets Layer module.

Frequently the client application 1100 communicates with the sever process 1300 to carry out a user transaction application. The user transaction application may be a commercial transaction (sometimes referred to as "E-Commerce"), although one skilled in the art is familiar with may other user transaction applications conventionally practiced in, for instance the Internet environment. Frequently, user transaction applications are implemented with "forms." The HTML specification (version 3.2, the proposed version 4.0, and it is likely later-developed versions available from the World Wide Web Consortium at <http:H/www.w3c.org> or through the MIT Laboratory for Computer Science in Cambridge, Mass.) has particular provisions for forms that are conventionally used for transactions, although many other conventional Internet programming techniques are also used for forms-based user transaction applications.

Figure 3:
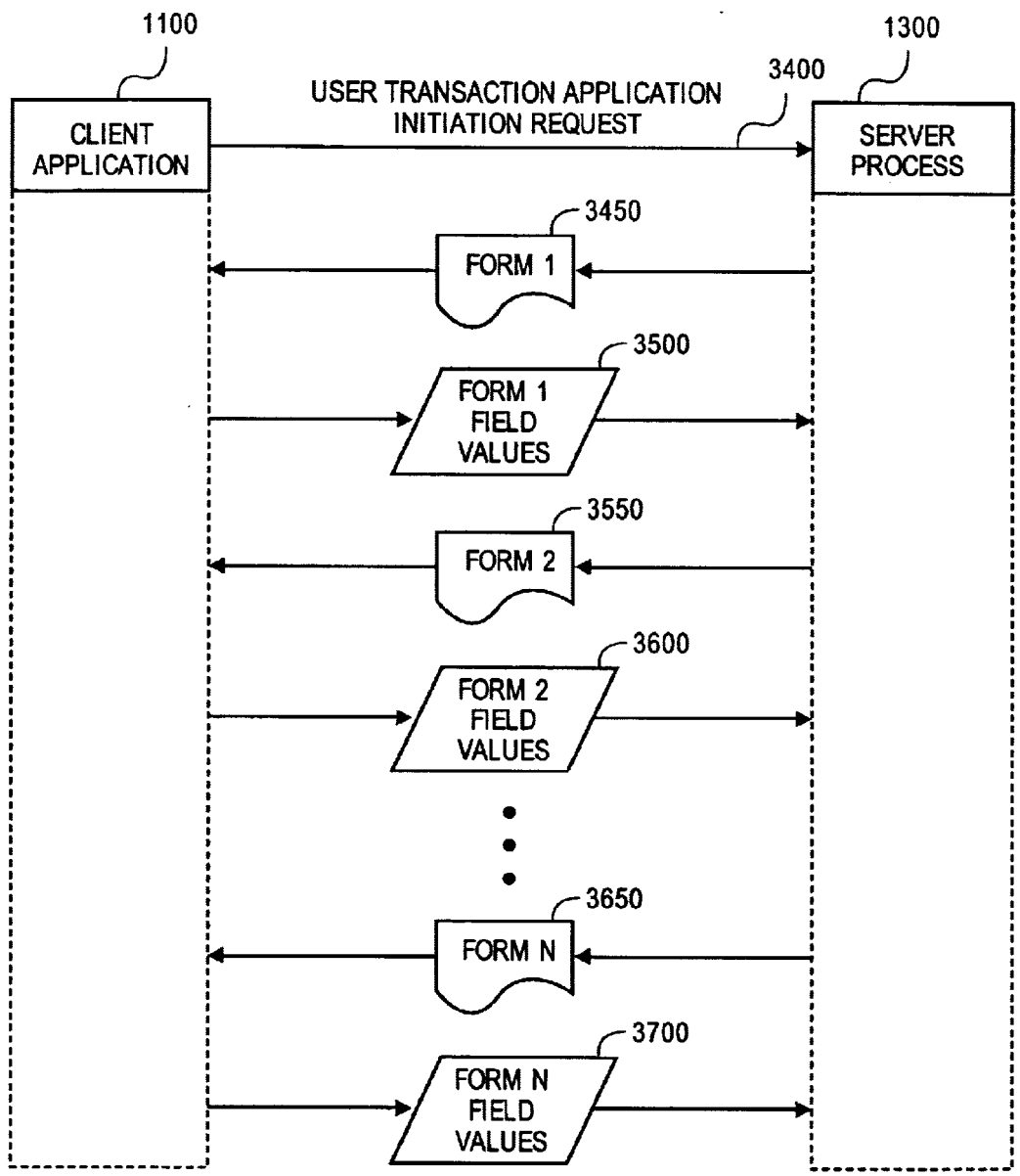
FIG. 3 is a diagram of a conventional user transaction application using form pages.

FIG. 3 depicts a diagram of a conventional user transaction application using form pages. The client application 1100 sends a user transaction application initiation request 3400 to the sever process 1300 to initiate the user transaction application. The user transaction application initiation request 3400 may be a Request Message in accordance with the HTTP specification which comprises a Uniform Resource Identifier ("URI") that corresponds to a resource available on the sever process 1300 which initiates execution of the user transaction application. Forms are typically used in user transaction applications to receive input from the user that is necessary to complete the user transaction application. A form comprises one or more form fields; the user provides form field values for the one or more form fields. With reference to FIG. 3, a first form page 3450 is communicated from the sever process 1300 to the client application 1100 which renders the form page. The client application 1100 then receives user input for the form field values and communicates first form page field values 3500 to the sever process 1300.

Frequently, and particularly when the client application 1100 renders on a display with limited resolution (compared to a PC) such as a television, forms for completion of the user transaction application span multiple pages. This is depicted in FIG. 3 where the sever process 1300 communicates a second form page 3550 to the client application 1100 which responds with a second form page field values 3600 after the user has entered the appropriate form field values. This process may continue for several iterations, and a Nth form page 3650 and a Nth form page field values 3700 are depicted for some integer 'N' greater than 2. For PC-oriented forms, N rarely exceeds 5. However, as noted above, when completion of user transaction applications requires several form pages, server resources may become burdened and user frustration may increase, perhaps reducing the likelihood the user will engage in subsequent transactions with the operator of the sever process 1300. Accordingly it is desirable that, when possible, form pages for completion of user transaction application should be suppressed.

Figure 4:
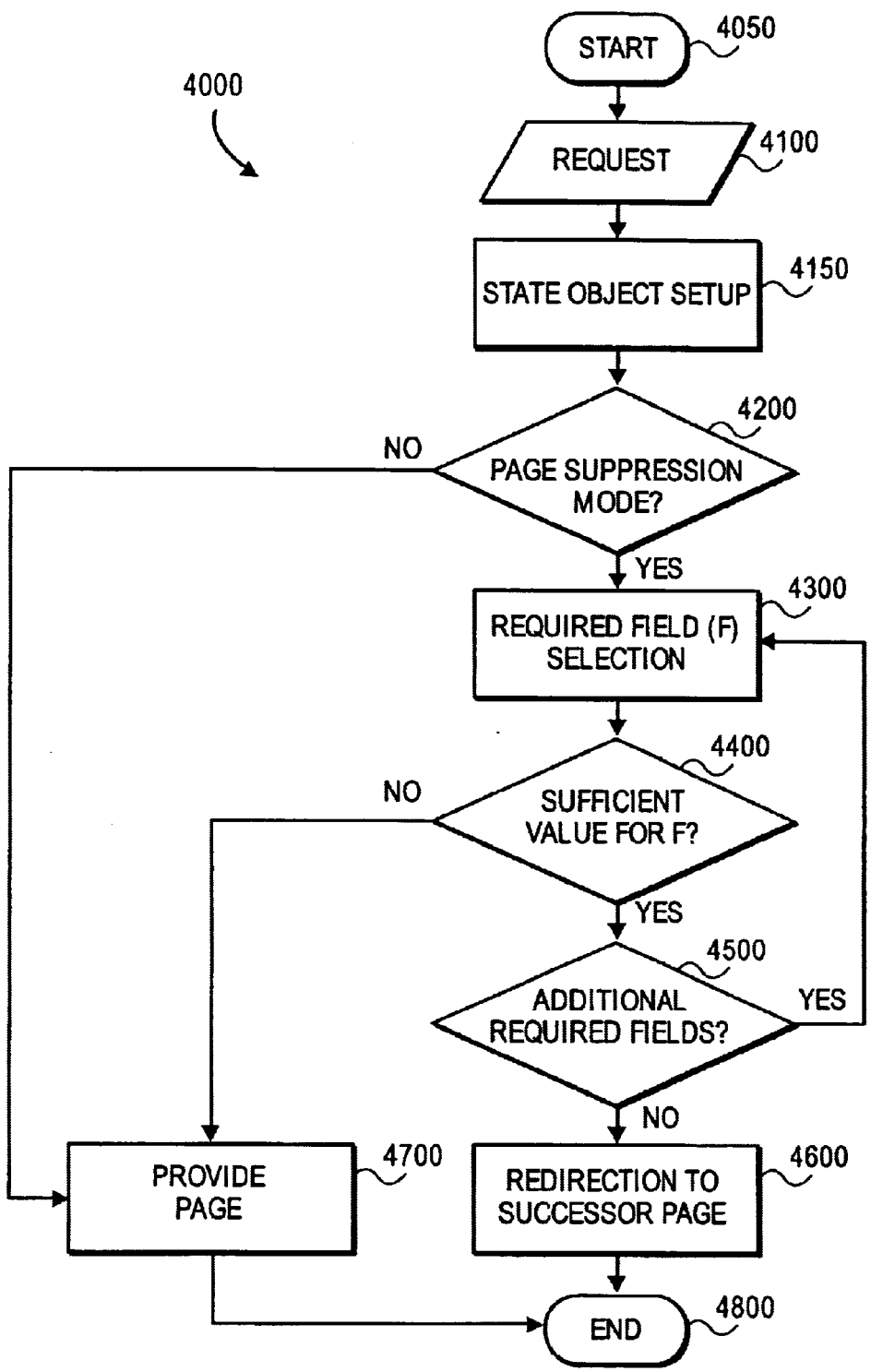
FIG. 4 depicts a flow diagram of a method for automatic page suppression in forms in accordance with an illustrative embodiment.

FIG. 4 depicts a flow diagram of an 'automatic page suppression' method 4000 in accordance with an illustrative embodiment. The 'automatic page suppression' method 4000 is carried on by a server process configured for operation with a dynamic contents document, for instance one that contains application logic that describes how to process a request to generate a response. Several conventional dynamic document architectures are known in the art including, for instance, Sun Microsystems' JavaServer Pages, or Microsoft Corporation's Active Server Pages. Other conventional server-side scripting architectures could also be used.

The 'automatic page suppression' method 4000 depicts process flow of an interaction of the dynamic contents document and the sever process 1300 in handling a user transaction application initiated from the client application 1100. Process flow initiates at a 'start' terminal 4050 and continues to receive a 'request' data block 4100 corresponding to an indication from the user of the client application of initiation of the user transaction application. The sever process 1300 retrieves a resource corresponding to the request. In this illustrative embodiment, the resource is a JavaServer Page type dynamic contents document. The server process begins processing the application logic of the dynamic contents document.

One aspect of the application logic is to maintain state information from a first portion of the user transaction application so that it is available to later portions of the user transaction application. For instance, if the user transaction application comprises several pages in which user information input is received, the user information input from the first of the several pages should be maintained for completion of the user transaction application. A 'state object setup' process 4150 executes in which the sever process creates a state object for maintaining state information across plural portions of the user transaction application. When JavaServer Page type dynamic contents documents are used, the state object may be a JAVA Bean. Other state objects could be used depending on the server process architecture, either more sophisticated programatically, or less sophisticated, for instance a temporary file.

Process flow continues to a 'page suppression mode' decision process 4200 that determines if the user transaction application should execute in page suppression mode. A selectable option may be provided for determining whether the user transaction application should execute in page suppression mode. Preferably, when the selectable option is selected the user transaction application executes with page suppression. In some embodiments, the selectable option is provided to an operator of the server process. In other embodiments, the selectable option is provided to the user of the client application. In this instance, the user selects whether to complete the user transaction application with page suppression and the user's selection is transmitted to the server process. A preliminary page in the user transaction application could provide the selectable option to the user; the selectable option could be a user interface element, for instance, a button, a check box, etc. In still other embodiments, the selectable option could be a field in a profile for the user and the server process could examine this field to determine whether the user transaction application should execute in page suppression mode.

The 'page suppression mode' decision process 4200 is a method executed by the server process in processing the application logic of the dynamic contents document. If the user transaction application should execute in page suppression mode, the 'page suppression mode' decision process 4200 exits through its 'yes' branch. In this illustrative embodiment, the dynamic contents document defines a set of form fields required for completion of the user transaction application. The dynamic contents document further comprises a method invocation for determining whether sufficient form field values are available for the set of form fields so that suppression of the page(s) soliciting user input of the form field values may be suppressed.

When processing the dynamic contents document, the server processes invokes this method and its execution initiates. Process flow continues to a 'required field selection' process 4300. The 'required field selection' process 4300 selects one of the set of form fields that are required to complete the user transaction application (mnemonically "F"). A user transaction application may have fields that are not required to complete the user transaction application. Preferably the dynamic contents document comprises a set of form fields that are required to complete that portion of the user transaction application associated with the dynamic contents document and the 'required field selection' process 4300 selects from that set. No particular manner of selection is fundamental, iteration through a list is typically sufficient. Process flow continues to a 'sufficient field value' decision process 4400.

The 'sufficient field value' decision process 4400 determines if a sufficient form field value exists for the one of set of form fields to complete the user transaction application. The user of the client application submitting the 'request' data block 4100 may have user profile information accessible to the server process that can be accessed to provide the form field value for the one of the set of form fields. Commonly, the user of the client application is queried to provide user identification information, e.g., a user ID and password, at the initiation of a session of which the user transaction application is a part. If this is the case, the user identification information can be used to access the user profile information which can then be examined for the form field value, e.g., a shipping address or postal code for the user, payment instrument information, product size, color, or configuration preferences, etc. In other instances, user profile information is not stored; however, records of previous interactions during the same session could be kept and used for the form field value. For instance, during a first user transaction application a user could purchase a first item; the server process could be configured to store a record of this interaction for the duration of the user's session. Were the user to initiate a second user transaction application to purchase a second item, the stored record of the previous interaction could be accessed by the server for the form field value. Still, further, client-side state objects could also be used for storing the form field value and the client-side state object could be queried from the server process. In addition, a third party information manager (sometimes referred to as an "infomediary") could store the user information and the sever process 1300 could query the third party information manager.

In some embodiments, the determination made by the 'sufficient field value' decision process 4400 as to whether a sufficient form field value is available is context insensitive. For instance, the 'sufficient field value' decision process 4400 may simply determine if there is a non-NULL value for the form field value, and, if so, deem that sufficient information is available with respect to the one of the set of form fields. In other embodiments, the 'sufficient field value' decision process 4400 could perform more complex context-sensitive determinations. Still further, form field value validation logic could also be performed. For instance, a postal code could be verified for an appropriate number of digits, an email address could be examined for compliance with the relevant specifications, a domain name could be resolved to determine if it corresponds to a reachable host, etc.

If the 'sufficient field value' decision process 4400 determines a sufficient form field value is available for the one of the set of form fields, it exits through its 'yes' branch and process flow continues to an 'additional required fields' decision process 4500. If the 'sufficient field value' decision process 4400 determines that a sufficient form field value is not available, it exits through its 'no' branch. In this instance, the server process completes execution of the invoked method and continues to a 'provide page' process 4700 to provide the dynamic contents document to the client application for receiving the form field value.

When the 'sufficient field value' decision process 4400 exits through its 'yes' branch, process flow continues within the invoked method to the 'additional required fields' decision process 4500. While members of the set of form fields that are required for completion remain for which the determination has not been made that a sufficient form field value is available, the 'additional required fields' decision process 4500 exits through its 'yes' branch and process flow returns to the 'required field selection' process 4300 for another iteration. When the 'additional required fields' decision process 4500 exits through its 'no' branch, process flow continues to a 'redirection to successor page' process 4600. The 'additional required fields' decision process 4500 exits through its 'no' branch only when each of the set of form fields required for completion has been examined and it has been determined that a sufficient form field value is available. That is, the page that would have been provided by the 'provide page' process 4700 did not need to be provided to receive user input of one or more of the form field values: provision of the page has been suppressed.

The 'redirection to successor page' process 4600 is performed by the invoked method and returns a response to the request received in the 'request' data block 4100 that redirects the request to a next page in the user transaction application. As one of skill in the art will appreciate, the redirection may be either entirely internal to the server process, or the client application may be provided with the response and the client application would then submit a next request to the next page. Preferred embodiments employ internal server redirection, however this is not fundamental.

In some embodiments, the 'redirection to successor page' process 4600 appends the set of form fields and their corresponding form field values onto the request when redirecting the request to the next page. This allows information received or retrieved when processing a current page to be made available when processing the next page. Still further, in some applications simply redirecting to the next page's URI circumvents processing of the form values desirable for successful completion of the user transaction application. For instance, processing of a shipping address and postal code could be used to determine, for instance, product sales tax and calculation of the latter could be triggered by the "posting" of the former from its form page. Such applications preferably redirect to the next page's URI while including a query string comprising all required form field/value pairs, this function may be performed by including a formatted query string comprising the set of form fields and their corresponding form field values. From the 'redirection to successor page' process 4600 or the 'provide page' process 4700, process flow completes through an 'end' terminal 4800.

JUST IN TIME PAGINATION

Figure 5:
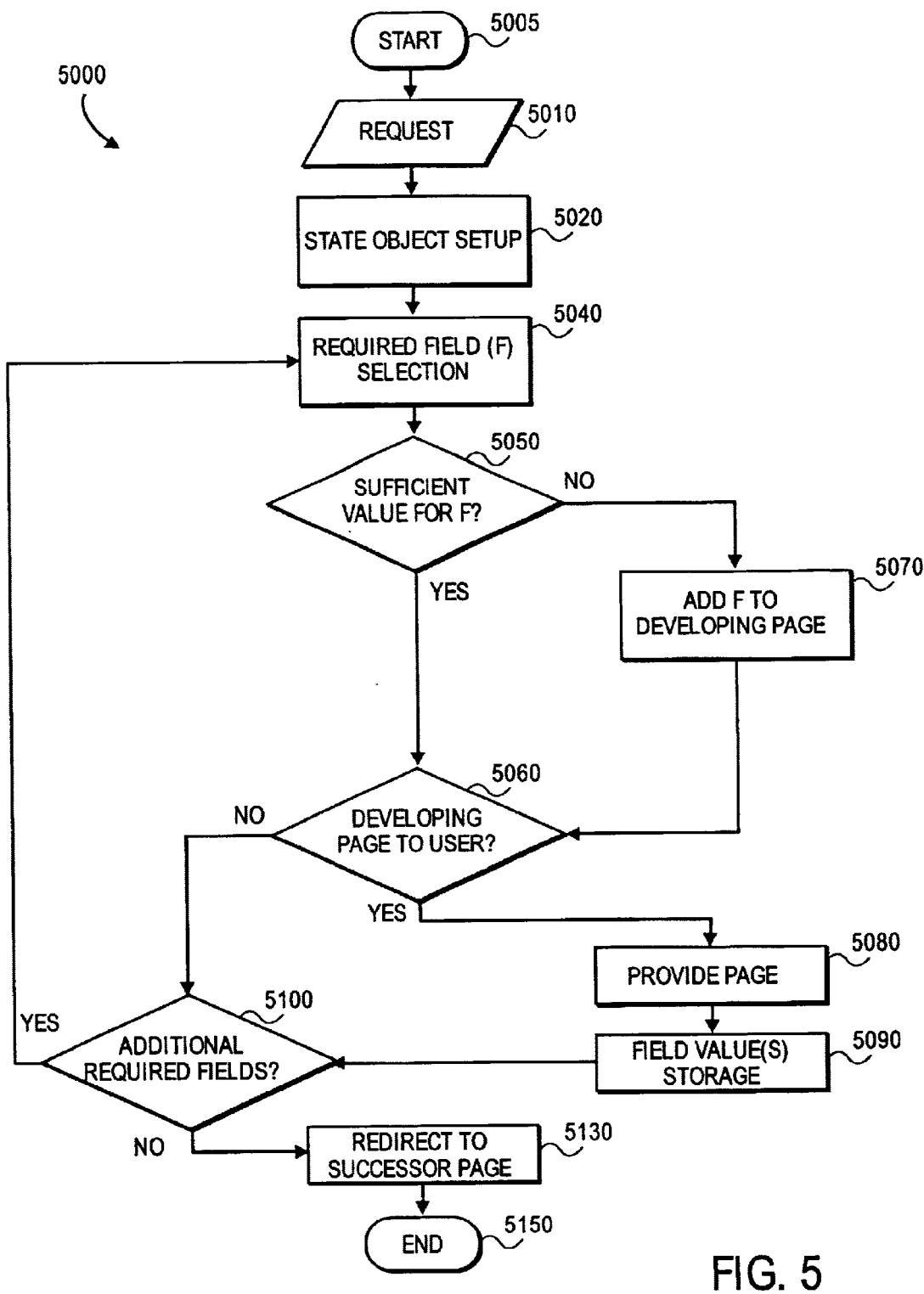
FIG. 5 depicts a flow diagram of a method for automatic page suppression in forms with just in time pagination.

In the above-described illustrative embodiment, user information requests were provided though a plurality of ordered pages of predetermined length. However, it is not fundamental that the user transaction application be split across the plurality of ordered pages, or that pages be of a predetermined length. Rather, pagination may occur responsive to the number and type of the set of form fields for which sufficient information is not available. T6 further illustrate this aspect, FIG. 5 depicts a flow diagram of a 'just in time automatic page suppression' method 5000 in accordance with an illustrative embodiment. The 'just in time automatic page suppression' method 5000 is similar to the 'automatic page suppression' method 4000 in that it involves the interaction of a server process with a dynamic contents document and shares several steps for performing analogous functions.

Process flow initiates at a 'start' terminal 5005 and continues to receive a 'request' data block 5010 corresponding to an indication from the user of the client application of initiation of the user transaction application. The server process retrieves a resource corresponding to the request. In this illustrative embodiment, the resource is a JavaServer Page type dynamic contents document. The server process begins processing the dynamic contents document. Process flow continues to a 'state object setup' process 5020 that creates a state object for maintaining state information across plural portions of the user transaction application. Next, a 'required field selection' process 5040 executes analogously to the 'required field selection' process 4300 described above. Process flow continues to a 'sufficient field value' decision process 5050 that performs functions similar to both the 'page suppression mode' decision process 4200 and the 'sufficient field value' decision process 4400 of FIG. 4.

Just in time pagination effectively provides field suppression on a field-by-field basis and there need not be predetermined pages at all. However, the user or the operator of the server process may desire to provide all required form fields to the user. For instance, the user may desire to verify or re-enter previously entered form field values. Thus, the features of the 'page suppression mode' decision process 4200 could also be beneficially used with just in time pagination.

A selectable option could be provided to the user or the server process operator as described above in connection with the 'page suppression mode' decision process 4200. With just in time pagination, preferred embodiments provide all required form fields (with any available form field values filled in for review and editing by the user) if page suppression mode is not selected. The 'sufficient field value' decision process 5050 examines whether page suppression mode has been selected with the selectable option.

If page suppression mode is not selected, the 'sufficient field value' decision process 5050 treats all of the set of form fields as lacking a sufficient form field value and exits through its 'no' branch. When page suppression is selected, the 'sufficient field value' decision process 5050 executes analogously to the 'sufficient field value' decision process 4400 of FIG. 4. That is, it exits through its 'no' branch if, and only if, it determines a sufficient form field value is unavailable.

When, the 'sufficient field value' decision process 5050 exits through its 'no' branch the one of the set of form fields ("F") should be added to a page that will be provided to the user for receiving the form field value. When page suppression is not selected, this occurs for each of the set of form fields.

Typically plural form fields may be suitably arranged on a single page. In this illustrative embodiment, the separation of the form fields from the set of form fields for which form field values are required into an appropriate number of pages occurs when the determination is made that a sufficient form field value is not available. The pagination is just in time. In this instance, just in time pagination is accomplished by creating a developing page for a first form field. Additional form fields are added to the developing page until it is determined that the developing page should be provided to the user to receive user input. If additional form fields require user input a next developing page is created and additional form fields added to it until it is determined that the next developing page should be provided to the user to receive user input. This process can continue until there are no remaining form fields for which user input is required. When the 'sufficient field value' decision process 5050 exits through its 'no' branch, an 'add F to developing page' process 5070 adds the form field to the developing page.

Depending, for instance, on the client application, the number and nature of the set of form fields that are appropriate for a single page may vary. For example, if the client application is a platform integrating television reception and, for instance an HTTP, client, such as a conventional set-top box, then a user's display is likely a conventional television. If the user's display is a conventional television suitable screen area for the page is more limited than if the user's display were a conventional display use with a personal computer or workstation. For instance, suitable screen area of a conventional television may be 544 (width) by 300 (height) pixels. While a single page, when rendered, could exceed this, it may be desirable that a single page fit within the suitable screen area so that the user is not inconvenienced by having to scroll or navigate across multiple screens of the page.

From the 'add F to developing page' process 5070 and when the 'sufficient field value' decision process 5050 exits through its 'yes' branch indicating a sufficient form field value is available, process flow continues to a 'developing page to user' decision process 5060. The 'developing page to user' decision process 5060 tests two conditions; if either of the conditions are true, the developing page should be provided to the user for data input.

The first test condition is whether the developing page is full. A conventional two-dimensional bin packing algorithm may be used for this test, as may simpler heuristics. If a bin packing algorithm is used, the suitable screen area may be obtained, for instance from a predetermined value used by the server process, or responsive to an inference based on the type of client application. For example, an inference could be made that if the client application is a set-top box, the suitable screen area is that of a television screen. The screen area (in pixels) of a form field along with any previous form fields added to the developing page could be used by the bin packing algorithm to determine if another of the form fields can be added to the developing page. If another form field cannot be added, the developing page is full and the first test condition is true. The second test condition is whether the developing page should be provided even if it is not full. The situation occurs when at least one of the set of form fields has been added to the developing page—but the developing page is not full—and there are no additional required fields. In this instance, the page should be provided even though it is not full and the second test condition is true.

If either the first or second test condition is true, the 'developing page to user' decision process 5060 exits through its 'yes' branch and process flow continues to a 'provide page' process 5080 that provides the completed developing page to the client application for user input of the form field value. When the user input is received, process flow continues to a 'field value(s) storage' process 5090 that stores the form field value received from the user. In some embodiments, the 'field value(s) storage' process 5090 stores the form field value in the state object created by the 'state object setup' process 5020; in other embodiments, the 'field value(s) storage' process 5090 stores the form field value along with the set of form fields as field/value pairs in a string that can be later passed as a query string portion of a URI as previously described.

As described above, testing of whether the developing page was full occurred after a field was added to the developing page. This is suitable in situations where form fields are of nearly constant space, e.g. input boxes and drop-down menus. As most user transaction applications are of this type, the post-testing is suitable. In instances where the expected form fields are not of nearly constant space, a pre-addition test could be used and when the developing page was full, a next page started, the form field provided to the next page, and the developing page be provided to the user.

From the 'field value(s) storage' process 5090 and when the 'developing page to user' decision process 5060 exits through its 'no' branch indicating both the first and second test conditions are false, process flow continues to the 'additional required fields' decision process 5100. The 'additional required fields' decision process 5100 performs analogously to the 'additional required fields' decision process 4500 which was previously described. While members of the set of form fields remain for which the determination has not been made that a sufficient form field value is available, the 'additional required fields' decision process 5100 exits through its 'yes' branch and process flow returns to the 'required field selection' process 5040 for another iteration. When the 'additional required fields' decision process 5100 exits through its 'no' branch, process flow continues to a 'redirection to successor page' process 5130.

The 'redirection to successor page' process 5130 redirects the request received in the 'request' data block 5010 to the successor page in the user transaction application, which, when just in time pagination is employed, is typically a page that informs the user that the user transaction application has been completed. As described above in connection with the 'redirection to successor page' process 4600, the redirected request may comprise a query string with field/value pairs. Process flow then completes through an 'end' terminal 5150.

Although the present invention has been described in terms of features illustrative embodiments, one skilled in the art will understand that various modifications and alterations may be made without departing from the scope of the invention. Accordingly, the scope of the invention is not to be limited to the particular embodiments discussed herein, but should be defined only by the allowed claims and equivalents thereof.

What is claimed is:

1. A computer-implemented method of reducing the number of pages provided for user input in forms-based user transaction applications, said computer-implemented method comprising:

examining a set of form fields of a page associated with a user transaction application for determining if form field values corresponding to said set of form fields are available to complete information required to complete the page of said user transaction application prior to providing the page for the user input of values for the set of form fields; and if at least one of said form field values corresponding to said set of form fields is unavailable, providing an additional page for receiving said at least one of said set of form field values; and otherwise suppressing provision of the page to the user and providing a request to a successor page for further processing of said user transaction application.

2. The computer-implemented method according to claim 1 wherein:

said set of form fields is divided among a plurality of ordered pages; and said step of providing a request to a successor page comprises redirecting a request to said successor page.

3. The computer-implemented method according to claim 1 further comprising:

providing a selectable option for determining whether said user transaction application should have the number of pages for user input reduced and, wherein reducing the number of pages provided for user input occurs only if said selectable option is selected.

4. The computer-implemented method according to claim 1 wherein providing a page for receiving said at least one of said set of form field values comprises:

repetitively adding at least one of said form fields corresponding to said at least one of said set of form field values to a developing page; and providing said developing page for receiving said at least one of said set of form field values.

5. The computer-implemented method according to claim 4 wherein the step of adding at least one of said form fields comprises:

determining if adding at least one of said form fields would result in said developing page, when rendered by a client application, to exceed predetermined limits, and;

if not, adding said at least one of said form fields to said developing page.

6. A computing apparatus configured for reducing the number of pages provided for user input in forms-based user transaction applications, comprising:

means for examining a set of form fields of a page associated with a user transaction application prior to providing the page for the user input of values for the set of form fields;

means for determining if form field values corresponding to said set of form fields are available to complete information required to complete the page of said user transaction application; and means for providing an additional page for receiving said at least one of said set of form field values if at least one of said form field values corresponding to said set of form fields is unavailable and otherwise suppressing provision of the page to the user and providing a request to a successor page for further processing of said user transaction application.

7. An apparatus according to claim 6 further comprising:

means for providing a selectable option for determining whether said user transaction application should have the number of pages for user input reduced and, wherein
reducing the number of pages provided for user input in forms-based user transaction applications occurs only if said selectable option is selected.

8. An apparatus according to claim 6 wherein:

said set of form fields is divided among a plurality of ordered pages; and wherein providing a request to a successor page comprises redirecting a request to said successor page.

9. An apparatus according to claim 6 wherein providing a page for receiving said at least one of said set of form field values comprises:

repetitively adding at least one of said form fields corresponding to said at least one of said set of form field values to a developing page; and providing said developing page for receiving said at least one of said set of form field values.

10. An apparatus according to claim 9 wherein adding at least one of said form fields comprises:

determining if adding at least one of said form fields would result in said developing page, when rendered by a client application, to exceed predetermined limits, and if not, adding said at least one of said form fields to said developing page.

11. A computer program product comprising a computer readable storage medium having computer readable code embodied therein for reducing the number of pages provided for user input in forms-based user transaction applications, said computer readable code comprising;

code for examining a set of form fields of a page associated with a user transaction application prior to providing the page for the user input of values for the set of form fields;

code for determining if form field values corresponding to said set of form fields are available to complete information required to complete the page of said user transaction application; and code for providing an additional page for receiving said at least one of said set of form field values if at least one of said form field values corresponding to said set of form fields is unavailable and otherwise suppressing provision of the page and providing a request to a successor page for further processing of said user transaction application.

12. The computer program product according to claim 11 wherein said set of form fields is divided among a plurality of ordered pages; and wherein providing a request to a successor page comprises redirecting a request to said successor page.

13. The computer program product according to claim 11 further comprising code for providing a selectable option, said selectable option for determining whether said user transaction application should have the number of pages for user input reduced and, wherein reducing the number of pages provided for user input in forms-based user transaction applications occurs only if said selectable option is selected.

14. The computer program product cording to claim 11 wherein said code providing a page for receiving said at least one of said set of form field values comprises:

code for repetitively adding at least one of said form fields corresponding to said at least one of said set of form field values to a developing page; and code for providing said developing page for receiving said at least one of said set of form field values.

15. The computer program product according to claim 14 wherein adding at least one of said form fields comprises:

determining if adding at least one of said form fields would result in said developing page, when rendered by a client application, to exceed predetermined limits, and if not, adding said at least one of said form fields to said developing page.

* * * * *